(12) United States Patent
Peterson et al.

(10) Patent No.: US 9,854,313 B2
(45) Date of Patent: Dec. 26, 2017

(54) METHODS AND SYSTEMS FOR PRESENTING INFORMATION ABOUT MEDIA ASSETS

(71) Applicant: Rovi Guides, Inc., Santa Clara, CA (US)

(72) Inventors: Brian Peterson, Barrington, IL (US); Phil Golyshko, Pacifica, CA (US)

(73) Assignee: ROVI GUIDES, INC., San Carlos, CA (US)

( * ) Notice: Subject to any disclaimer, the term of this patent is extended or adjusted under 35 U.S.C. 154(b) by 0 days.

(21) Appl. No.: 14/581,541

(22) Filed: Dec. 23, 2014

(65) Prior Publication Data

US 2016/0182965 A1   Jun. 23, 2016

(51) Int. Cl.
  *H04N 5/445* (2011.01)
  *H04N 21/472* (2011.01)
  *H04N 21/431* (2011.01)

(52) U.S. Cl.
  CPC ... *H04N 21/47217* (2013.01); *H04N 21/4312* (2013.01)

(58) Field of Classification Search
  CPC .................. H04N 21/4858; H04N 21/442
  USPC ........................................................ 725/37
  See application file for complete search history.

(56) References Cited

U.S. PATENT DOCUMENTS

| | | | |
|---|---|---|---|
| 6,239,794 B1 | 5/2001 | Yuen | |
| 6,564,378 B1 | 5/2003 | Satterfield | |
| 6,756,997 B1 | 6/2004 | Ward | |
| 7,165,098 B1 | 1/2007 | Boyer | |
| 7,506,356 B2 | 3/2009 | Gupta | |
| 8,046,801 B2 | 10/2011 | Ellis | |
| 2001/0048437 A1* | 12/2001 | Sato | G09G 5/30 345/471 |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2006/0020966 A1 | 1/2006 | Poslinski | |
| 2006/0045470 A1* | 3/2006 | Poslinski | H04N 5/44513 386/297 |
| 2007/0226766 A1 | 9/2007 | Poslinski et al. | |
| 2008/0092168 A1* | 4/2008 | Logan | G06F 17/30265 725/44 |
| 2008/0235733 A1* | 9/2008 | Heie | H04N 7/163 725/46 |
| 2009/0116817 A1 | 5/2009 | Kim et al. | |
| 2010/0153885 A1 | 6/2010 | Yates | |
| 2013/0191745 A1 | 7/2013 | Vella | |
| 2013/0290892 A1 | 10/2013 | Basapur et al. | |

(Continued)

OTHER PUBLICATIONS

Brian Peterson, U.S. Appl. No. 14/581,625, filed Dec. 23, 2014.

*Primary Examiner* — Michael B Pierorazio
(74) *Attorney, Agent, or Firm* — Haley Guiliano LLP

(57) ABSTRACT

Methods and systems are disclosed herein for a media guidance application that presents information about a media asset by modifying graphical properties of a progress bar associated with the media asset. For example, based on one or more events in the media asset, the media guidance application may modify the dimensions of the progress bar to include textual descriptions, may modify a color, brightness, transparency, etc. of the progress bar, and/or may modify an animation of the progress bar or a graphic associated with the progress bar.

18 Claims, 7 Drawing Sheets

(56) References Cited

U.S. PATENT DOCUMENTS

2013/0326561 A1* 12/2013 Pandey ............... G11B 27/031
                                                    725/58
2016/0182962 A1   6/2016 Peterson

* cited by examiner

METHODS AND SYSTEMS FOR PRESENTING INFORMATION ABOUT MEDIA ASSETS

BACKGROUND

In conventional systems, users have access to a plethora of media content through numerous media systems. Furthermore, while accessing that content a progress bar may indicate to a user at what point in the runtime of the media asset that user is currently situated. For example, the progress bar may appear as an on-screen overlay in the form of a straight line on which a graphic progresses along the length of the line as the user consumes the media asset. Despite the prevalence of progress bars in numerous media systems as well as the amount of on-screen real estate used for the progress bar, the information provided by a progress bar is limited.

SUMMARY

Accordingly, methods and systems are disclosed herein for a media guidance application that presents information about a media asset by modifying graphical properties of a progress bar associated with the media asset. For example, in addition to alerting the user to the user's progress in a media asset, the media guidance application may modify graphical properties of the progress bar to alert the user to events (e.g., circumstances, occurrences, and/or subject matter) in the media assets. For example, based on one or more events in the media asset, the media guidance application may modify the dimensions of the progress bar to include textual descriptions, may modify a color, brightness, transparency, etc., of the progress bar, and/or may modify an animation of the progress bar or a graphic associated with the progress bar.

In some aspects, the media guidance application may generate for display (e.g., via control circuitry) a progress bar for a media asset. For example, the media guidance application may overlay a progress bar on a media asset that is already generated for display.

The media guidance application may receive an indicium of an event in the media asset. For example, the media guidance application may receive data (e.g., either from a remote database or an object recognition component accessible by the media guidance application) that indicates and/or describes a particular event in the media asset. For example, data received from a social media network may indicate that a particular portion of a media asset includes an important or popular moment in the media asset. The media guidance application may use this data to modify the progress bar to indicate when this important or popular moment will occur.

The media guidance application may determine (e.g., via control circuitry) a point on the progress bar corresponding to the event. For example, the media guidance application may determine that a user is currently halfway through a media asset and may determine a point of the progress bar that corresponds to the halfway point in the media asset.

The media guidance application may modify (e.g., via control circuitry) a dimension (e.g., a size or a shape) of the progress bar at the point to accommodate a description of the event. For example, the media guidance application may expand the height of the progress bar such that text describing the event (e.g., as determined by cross-referencing the point with a database listing descriptions of events at various points in the media asset) can appear in the progress bar and be read by a user. For example, the media guidance application may determine an amount of space required to display the description and select a new dimension for the progress bar based on the amount of space required to display the description.

In some embodiments, the media guidance application may determine a type for the event. For example, different types of events may correspond to different graphical properties. The media guidance application may then cross-reference the type of event in a database listing graphical properties that corresponds to types of events to determine a graphical property that corresponds to the type of event and modify the progress bar to include the graphical property (e.g., a particular color, brightness, animation, etc.) at the event. For example, in response to determining that the event corresponds to a content of a particular parental control rating, the media guidance application may determine what graphical property is used for such events and modify the progress bar accordingly.

In some embodiments, the media guidance application may modify the progress point only when the user's progress in the media asset approaches the point on the progress bar corresponding to the event. For example, the media guidance application may determine a user's progress in the media asset and then determine whether or not the user's progress corresponds to the point. If so, the media guidance application may modify the dimensions of the progress bar. If not, the media guidance application may not modify the dimensions of the progress bar.

In some aspects, the media guidance application may generate for simultaneous display a first listing for a first media asset and a second listing for a second media asset. For example, the media guidance application may present a list of available media assets. The media guidance application may also determine a user's progress in the first media asset and the user's progress in the second media asset. For example, for each media asset in a list, the media guidance application may determine how much of the media asset has been consumed by the user.

The media guidance application may then determine a first graphical property based on a first event in the first media asset corresponding to the user's progress in the first media asset and a second graphical property based on a second event in the second media asset corresponding to the user's progress in the second media asset. For example, the media guidance application may cross-reference the first event with a database listing graphical properties that correspond to different events to determine the first graphical property.

The media guidance application may then generate for simultaneous display a first progress bar with the first graphical property for the first media asset and a second progress bar with the second graphical property for the second media asset. For example, if the user's progress in the first media asset corresponds to the appearance of a new character, the progress bar (or a graphic associated with the progress bar) may appear with a different color, a modified dimension, and/or a textual description of the event. Additionally or alternatively, if the user's progress in the second media asset corresponds to a scary scene, the progress bar may flash.

In some embodiments, the media guidance application may modify the graphical properties of a progress bar based on other factors that may be unrelated to a user's progress in the media asset. For example, the media guidance application may modify a progress bar based on a device upon which a portion of a media asset was consumed, a number of times a portion of a media asset was consumed, a user that consumed a portion of the media asset, and/or whether or not the portion corresponds to content from a social network.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DISCLOSURE OF THE DRAWINGS

Figure 1:
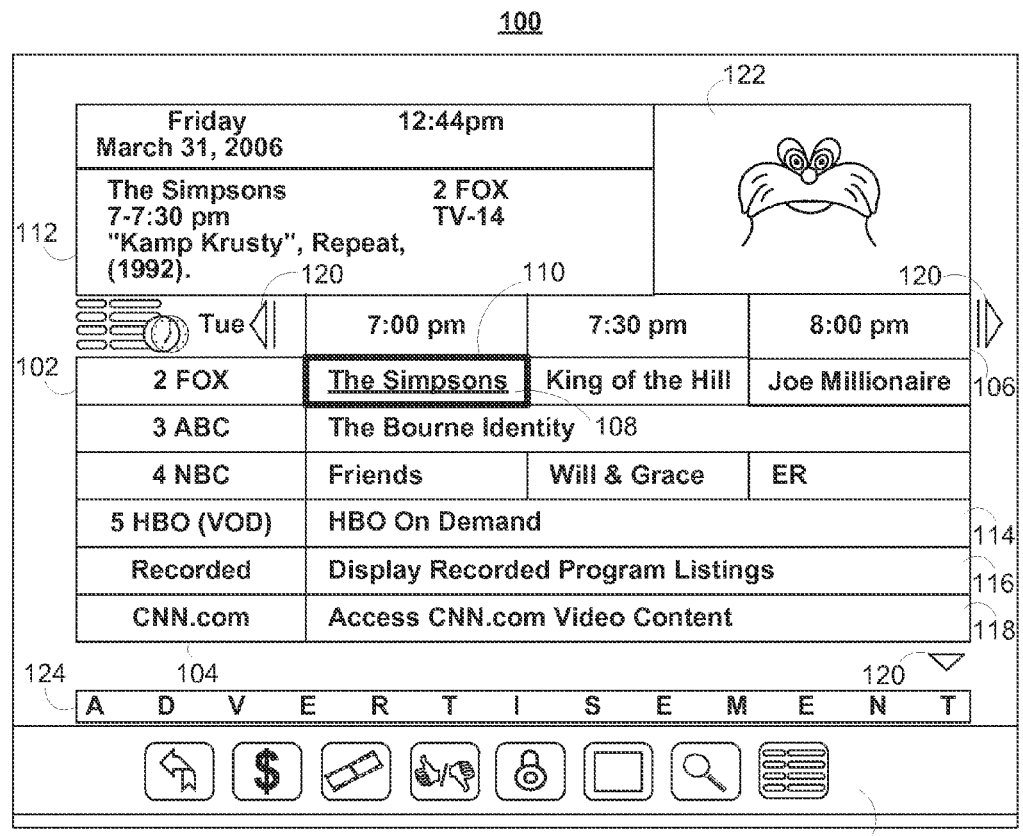
FIG. 1 shows an illustrative example of a display screen generated by a media guidance application in accordance with some embodiments of the disclosure.

Methods and systems are disclosed herein for a media guidance application that presents information about a media asset to a user. Specifically, the media guidance application may modify one or more characteristics of a progress bar associated with a media asset to indicate the information to the user. For example, in addition to alerting the user to the amount of a media asset that has been (or remains to be) consumed by a user, the media guidance application may modify graphical properties of the progress bar to alert the user to events occurring in the media assets.

As referred to herein, a "media guidance application" or "guidance application" is an application that allows a user, through an interface, to navigate to and access media content. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Media guidance applications may generate graphical user interface screens that enable a user to navigate among, locate and select content.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

The media guidance application may modify graphical properties of a progress bar. As referred to herein, a "progress bar" is any graphic that indicates a user's progress through a media asset. For example, a progress bar may appear as a timeline or other substantially linear graphic that indicates a beginning, end, or other position associated with a user's progress. In another example, a progress bar may include a graphic that indicates a percentage of the media asset that has been consumed by the user.

The progress bar may be associated with one or more graphical properties, which may be modified by the media guidance application. As referred to herein, a "graphical property" is any characteristic that affects the appearance of a progress bar. For example, a graphical property may include the dimensions (e.g., size and shape) of a progress bar. In another example, a graphical property may include a color, brightness, transparency level, animation, and/or other visual attribute of the progress bar. In some embodiments, the media guidance application may also include other audio, video, or textual content in or near the progress bar. For example, the media guidance application may present additional media content such as social media content (e.g., status updates, recommendations, etc., from a social network), music, audio alerts, and/or textual content associated with one or more events in the media asset.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, an "event" is any circumstance, occurrence, and/or subject matter in the media asset that is distinguishable from other circumstances, occurrences, and/or subject matter. For example, an event in a media asset may correspond to the appearance of a character, information associated with a particular plot line, content enjoyed (e.g., "liked") by one or more users, etc. In some embodiments, an event may correspond to a portion of a media asset. As referred to herein, a "portion" of a media asset is any segment of the media asset (e.g., a scene, a frame, a chapter, etc.) that is distinguishable from another segment of the media asset.

In some embodiments, the media guidance application may determine a type of the event. As referred to herein, a "type" of an event refers to a category of events. For example, types of events may include events liked by common characteristics or events for which the criteria used to determine whether or not an event is occurring is similar. For example, a type of event may correspond to the occurrence of media content that is not suitable for children. In such a case, the criteria for such an event may be based on whether or not content presented violates one or more parental control settings. In another example, a type of event may correspond to content received from a particular source (e.g., a social media network). In yet another example, a type of event may correspond to the appearance of particular content (e.g., a particular character in the media asset) or the availability of content associated with the media asset (e.g., deleted scenes, cast and crew information, added features, etc.).

In some embodiments, the media guidance application may modify the progress bar only when the user's progress in the media asset approaches the point on the progress bar corresponding to the event. For example, the media guidance application may determine a user's progress in the media asset and then determine whether or not the user's progress corresponds to the point. If so, the media guidance application may modify the dimensions of the progress bar. If not, the media guidance application may not modify the dimensions of the progress bar. Alternatively or additionally, the media guidance application may modify the progress bar at particular points (e.g., the beginning or end of the media asset or a scene in the media asset) or in response to a user input (e.g., requesting the progress bar or to view events in the media asset).

For example, the media guidance application may only modify the graphical properties of a progress bar before or after a fast-access playback operation. As referred to herein, the phrase "fast-access playback operation" should be understood to mean any media guidance application operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

In some embodiments, the media guidance application may modify the graphical properties of a progress bar based on other factors that may be unrelated to a user's progress in the media asset. For example, the media guidance application may modify a progress bar based on a device upon which a portion of a media asset was consumed, a number of times a portion of a media asset was consumed, a user that consumed a portion of the media asset, and/or whether or not the portion corresponds to content from a social network.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
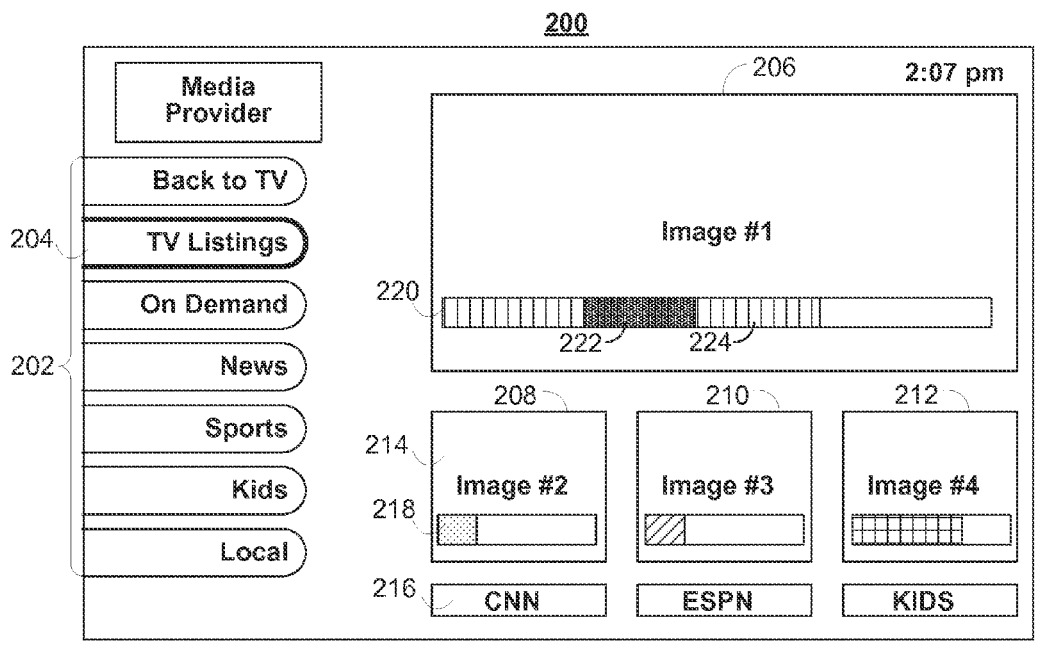
FIG. 2 shows another illustrative example of a display screen generated by a media guidance application featuring a plurality of progress bars with graphical properties determined based on events in corresponding media assets in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Display 200 also includes a plurality of progress bars (e.g., progress bars 218 and 220) corresponding to media listings (e.g., listing 208 and listing 206, respectively). Furthermore, the plurality of progress bars each have varying graphical properties. For example, the media guidance application presenting display 200 has selected the graphical properties for each of the progress bars based on the content of the media asset that corresponds to the user's progress in that media asset. For example, progress bar 218 indicates that a user is not yet halfway through a media asset associated with listing 208. Likewise, the media guidance application has selected a graphical property for progress bar 218 that corresponds to content that would be currently consumed by the user if the user selected listing 208.

Progress bar 220 includes multiple graphical properties. For example, progress bar 220 includes graphical property 222 and graphical property 224. For example, a portion of the media asset corresponding to graphical property 222 may correspond to a first event and a portion of the media asset corresponding to graphical property 224 may correspond to a second event. Alternatively, the media guidance application may select graphical property 224 based on a user's progress in the media asset, but also highlight a portion associated with graphical property 222 based on another factor.

For example, the media guidance application may modify the graphical properties of progress bar 220 based on other factors that may be unrelated to a user's progress in the media asset. For example, the media guidance application may modify progress bar 220 based on a device upon which a portion of a media asset (e.g., the portion corresponding to graphical property 222) was consumed, a number of times the portion of a media asset was consumed, a user that consumed the portion of the media asset, and/or whether or not the portion corresponds to content from a social network.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

Figure 3:
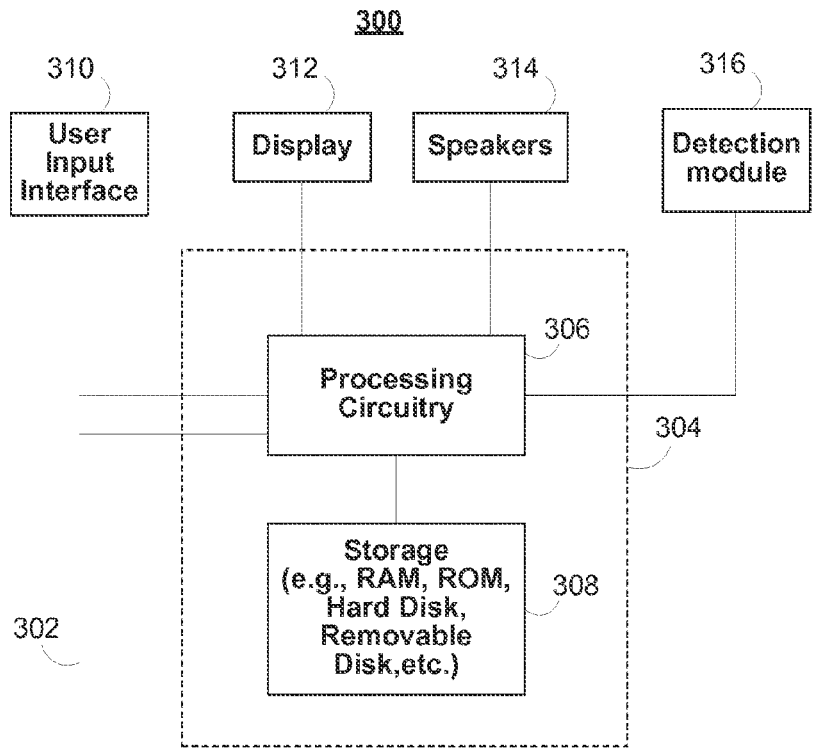
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device also includes detection module 316. In some embodiments, detection module 316 may be a stand-alone application wholly implemented. Alternatively, detection module 316 may be incorporated into user equipment device 300. The media guidance application may use detection module 316 to detect events in media assets. For example, the media guidance application may use a content recognition module or algorithm to generate data describing the context, content, and/or any other data necessary for detecting and identifying events in a media asset. For example, the content recognition module may use object recognition techniques such as edge detection, pattern recognition, including, but not limited to, self-learning systems (e.g., neural networks), optical character recognition, on-line character recognition (including but not limited to dynamic character recognition, real-time character recognition, intelligent character recognition), and/or any other suitable technique or method to determine objects in the media asset.

For example, the media guidance application may receive data in the form of a video. The video may include a series of frames. For each frame of the video, the media guidance application may use a content recognition module or algorithm to determine the objects (e.g., people, places, things, etc.) in each of the frames or series of frames, which may be used to detect or identify an event. For example, based on the detection of a multitude of explosions in the frames of a portion of the media asset, the media guidance application may identify an event (e.g., a car crash, fight scene, etc.) associated with that portion of the media asset.

In some embodiments, the content recognition module or algorithm may also include speech recognition techniques, including, but not limited to, Hidden Markov Models, dynamic time warping, and/or neural networks (as described above) to translate spoken words into text and/or processing audio data. The content recognition module may also combine multiple techniques to detect or identify an event.

In addition, the media guidance application may use multiple types of optical character recognition and/or fuzzy logic, for example, when processing keyword(s) retrieved from data (e.g., textual data, translated audio data, user inputs, etc.) describing the media asset (or when cross-referencing various types of data in databases). For example, in some embodiments, the media guidance application may detect or identify an event based on data (e.g., metadata) associated with a media asset. The data may be received from a remote source (e.g., media guidance data source 418 (FIG. 4)). In such cases, the data may identify and describe each event in a media asset. If the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical.

In some embodiments, the media guidance application may analyze data of a data structure or media asset frame for particular values or text using optical character recognition methods described above. For example, the media guidance application may process subtitles of the media asset to find particular characters or other event indicators that occurred in a media asset in order to detect and identify events.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
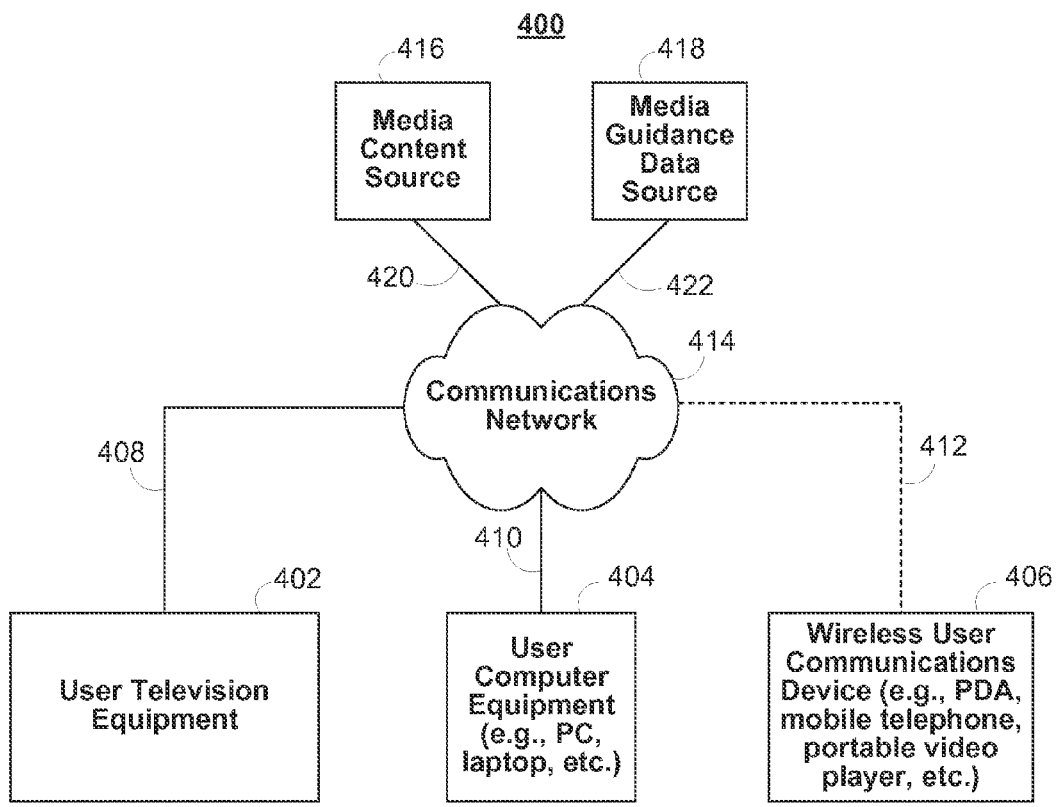
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
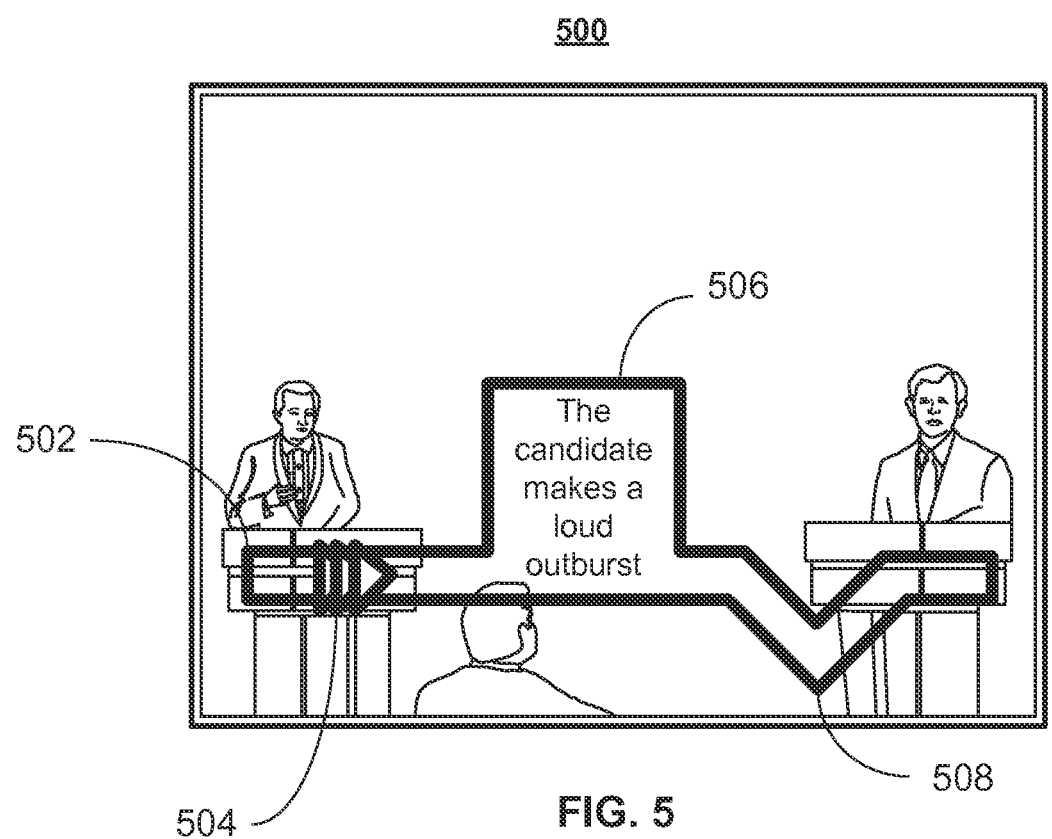
FIG. 5 shows an illustrative example of a progress bar with graphical properties determined based on events in a corresponding media asset in accordance with some embodiments of the disclosure.

FIG. 5 shows an illustrative example of a progress bar with graphical properties determined based on events in a corresponding media asset. For example, FIG. 5 shows display 500. In some embodiments, display 500 may appear on display 312 (FIG. 3) and/or user equipment device 402, 404, and/or 406 (FIG. 4)). For example, a media guidance application implemented on user equipment device 300 (FIG. 3)) may generate for display display 500.

Display 500 includes progress bar 502, which is currently overlaid on a presentation of a media asset in display 500. For example, progress bar 502 may indicate the progress of a user in consuming the media asset in display 500. Progress bar 502 also includes graphic 504, which may indicate the user's progress in the runtime (e.g., represented by the length of progress bar 502) in the media asset presented on display 500. It should be noted that in some embodiments, the media guidance application may alter the graphical properties of graphic 504 in addition to, or as an alternative to, altering the graphical properties of progress bar 502. Accordingly, it should be noted that any embodiment used to modify the graphical properties of a progress bar may also be applied to a graphic or other content near or associated with the progress bar.

The media guidance application has modified the graphical properties of progress bar 502 in multiple ways. For example, the media guidance application has modified progress bar 502 to allow for textual description 506 to appear within the confines of progress bar 502. For example, the media guidance application may have detected an event (e.g., corresponding to an outburst of a character in the media asset) and in response generated textual description 506.

Additionally, progress bar 502 includes depression 508. For example, depression 508 may indicate a drop in ratings, social media interactions, and/or other measures that indicate a portion of the media asset is unimportant or unpopular. Moreover, the shape (e.g., the depth of the depression) may correspond to the amount at which a portion of the media asset is deemed unimportant or unpopular by the media guidance application based on the received data.

Figure 6:
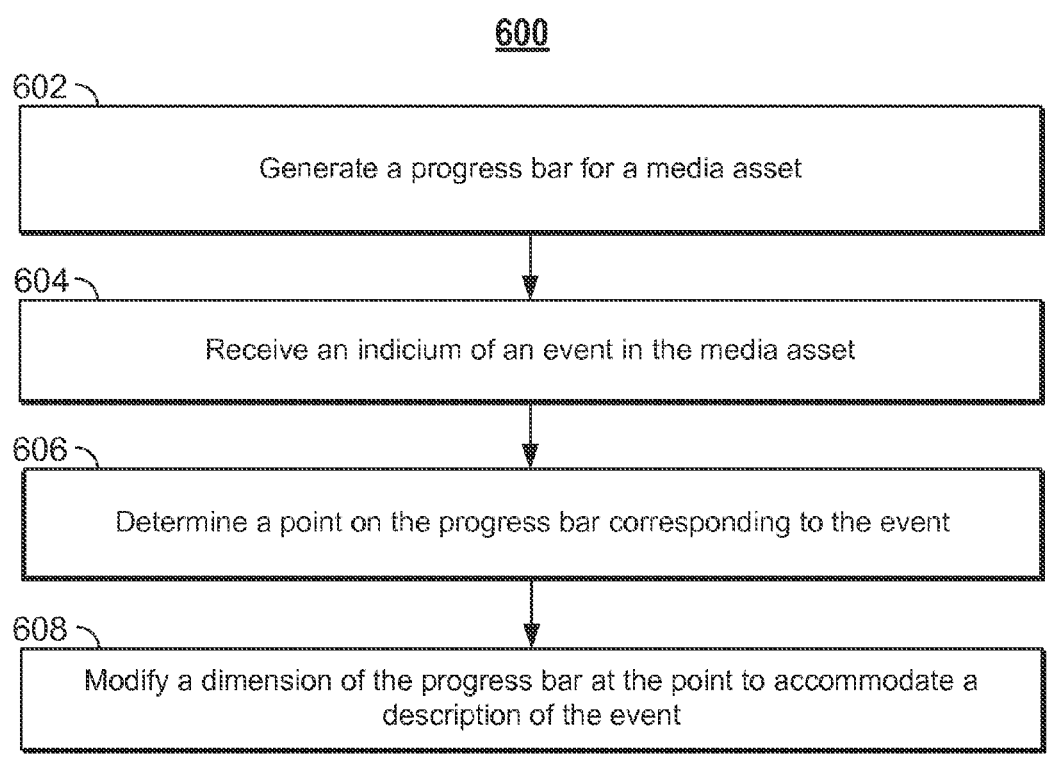
FIG. 6 is a flowchart of illustrative steps for modifying a dimension of the progress bar at the point to accommodate a description of the event in accordance with some embodiments of the disclosure.

FIG. 6 is a flowchart of illustrative steps for modifying a dimension of the progress bar at the point to accommodate a description of the event. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to modify a dimension of the progress bar at the point to accommodate a description of the event. In addition, one or more steps of process 600 may be incorporated into or combined with one or more steps of any other process or embodiment.

In step 602, the media guidance application generates for display (e.g., via control circuitry 304 (FIG. 3)) a progress bar for a media asset. For example, the media guidance application may overlay a progress bar (e.g., progress bar 502 (FIG. 5)) on a media asset that is already generated for display (e.g., on display 500 (FIG. 5)).

At step 604, the media guidance application receives an indicium of an event in the media asset. For example, the media guidance application may receive data that indicates and/or describes a particular event in the media asset. For example, the data may be received from a remote source (e.g., media guidance data source 418 (FIG. 4)), and local source (e.g., storage circuitry 308 (FIG. 3)), and/or from a component (e.g., detection module 316 (FIG. 3)). For example, the data may indicate that a particular portion of a media asset includes an event. In addition, the data may describe the event.

At step 606, the media guidance application may determine (e.g., via control circuitry 304 (FIG. 3)) a point on the progress bar corresponding to the event. For example, the media guidance application may determine that a user is currently halfway through a media asset and may determine a point of the progress bar that corresponds to the halfway point in the media asset. In another example, the data received by the media guidance application may indicate that the three-minute and fifty-second mark in the play length of a media asset corresponds to the introduction of an important plot point. In response, the media guidance application may identify (e.g., via control circuitry 304 (FIG. 3)) the point of the progress bar that corresponds to the three-minute and fifty-second mark in the play length of the media asset.

At 608, the media guidance application modifies (e.g., via control circuitry 304 (FIG. 3)) a dimension (e.g., a size or a shape) of the progress bar at the point to accommodate a description of the event (e.g., textual description 506 (FIG. 5)). For example, the media guidance application may (e.g., via control circuitry 304 (FIG. 3)) expand the height of the progress bar such that text describing the event can appear in the progress bar and read by a user.

For example, the media guidance application may cross-reference (e.g., via control circuitry 304 (FIG. 3)) the point with a database (e.g., located at storage 308 (FIG. 3) and/or any location accessible via communications network 414 (FIG. 4)) listing descriptions of events at various points in the media asset) to determine a description of the event at the point. The media guidance application may then determine (e.g., via control circuitry 304 (FIG. 3)) an amount of space required to display the description and select (e.g., via control circuitry 304 (FIG. 3)) a new dimension for the progress bar based on the amount of space required to display the description. For example, the media guidance application may determine the number of characters, spaces, font, font size, etc. associated with the textual description by parsing the textual description. Additionally or alternatively, the media guidance application may receive information (e.g., from the database) that indicates the number of characters, spaces, font, font size, etc. associated with the textual description.

In some embodiments, the media guidance application may determine (e.g., via control circuitry 304 (FIG. 3)) a type of the event. For example, different types of events may correspond to different graphical properties. For example, the media guidance application may present event of the same type in a similar manner such that may be learned by the user and/or are intuitive for the user to understand. For example, events associated with textual descriptions may appear within the progress bar (e.g., as shown with respect to textual description 506 (FIG. 5)). In contrast, events associated with ratings or popularity may appear as modifications to the shape or length of the progress bar (e.g., as shown with respect to depression 508 (FIG. 5)).

For example, after determining a type of an event, the media guidance application may cross-reference (e.g., via control circuitry 304 (FIG. 3)) the type of event in a database (e.g., located at storage 308 (FIG. 3) and/or any location accessible via communications network 414 (FIG. 4)) listing graphical properties that correspond to types of events to determine a graphical property that corresponds to the type of event. For example, the media guidance application may indicate events that violate a parental control setting by red, flashing icons, whereas the media guidance application may indicate events that indicate a social network friend of the user enjoyed a portion of the media asset by solid, green icons.

In some embodiments, the media guidance application may modify the progress point only when the user's progress in the media asset approaches the point on the progress bar corresponding to the event. For example, the media guidance application may determine (e.g., via control circuitry 304 (FIG. 3)) a user's progress in the media asset and then determine (e.g., via control circuitry 304 (FIG. 3)) whether or not the user's progress corresponds to the point. If so, the media guidance application may modify (e.g., via control circuitry 304 (FIG. 3)) the dimensions of the progress bar (e.g., progress bar 502 (FIG. 5)). If not, the media guidance application may not modify the dimensions of the progress bar.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
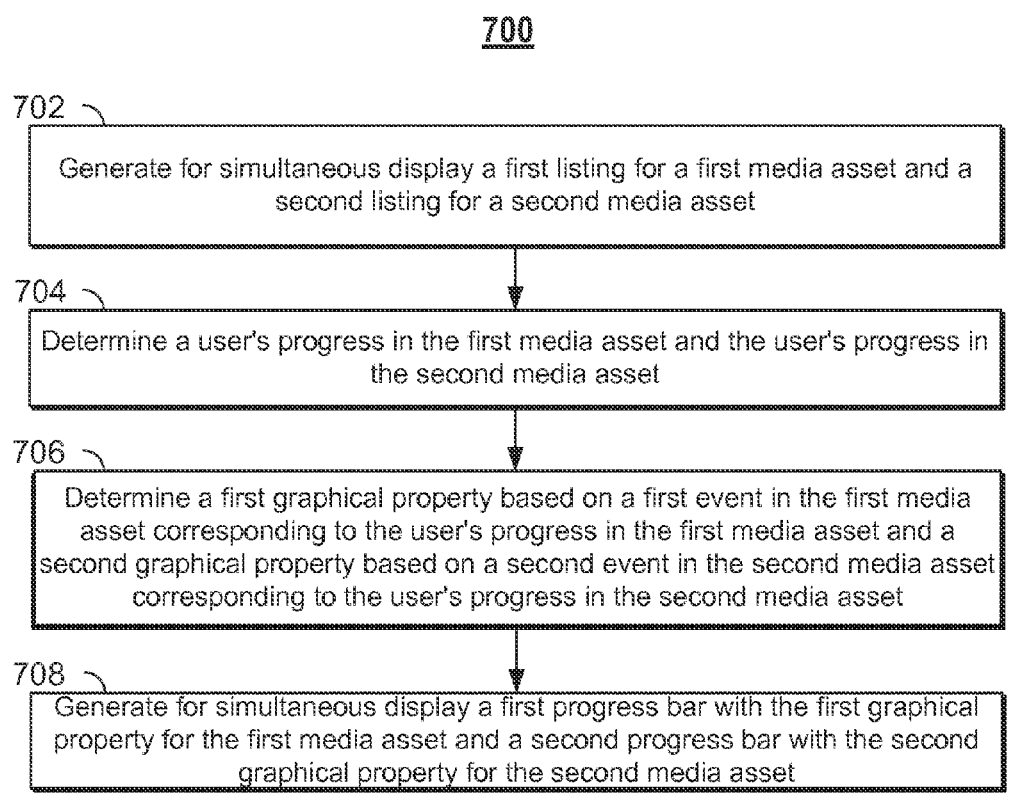
FIG. 7 is a flowchart of illustrative steps for modifying graphical properties in a plurality of simultaneously displayed progress bars based on events in corresponding media assets in accordance with some embodiments of the disclosure.

FIG. 7 is a flowchart of illustrative steps for modifying graphical properties in a plurality of simultaneously displayed progress bars based on events in corresponding media assets. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to modify graphical properties in a plurality of simultaneously displayed progress bars based on events in corresponding media assets. In addition, one or more steps of process 700 may be incorporated into or combined with one or more steps of any other process or embodiment.

At step 702, the media guidance application generates (e.g., via control circuitry 304 (FIG. 3)) for simultaneous display (e.g., on display 312 (FIG. 3)) a first listing (e.g., listing 206 (FIG. 2)) for a first media asset and a second listing (e.g., listing 208 (FIG. 2)) for a second media asset. For example, the media guidance application may present a list of available media assets (e.g., as shown in FIGS. 1-2).

At step 704, the media guidance application determines (e.g., via control circuitry 304 (FIG. 3)) a user's progress in the first media asset and the user's progress in the second media asset. For example, for each media asset in a list, the media guidance application may determine (e.g., via control circuitry 304 (FIG. 3)) how much of the media asset has been consumed by the user, how much of the media asset remains to be consumed by the user, the total length of a media asset, and/or any events occurring in the media asset.

At step 706, the media guidance application determines (e.g., via control circuitry 304 (FIG. 3)) a first graphical property (e.g., graphical property 222 (FIG. 2)) based on a first event in the first media asset corresponding to the user's progress in the first media asset and a second graphical property (e.g., graphical property 224 (FIG. 2)) based on a second event in the second media asset corresponding to the user's progress in the second media asset. For example, the media guidance application may cross-reference (e.g., via control circuitry 304 (FIG. 3)) the first event with a database (e.g., located at storage 308 (FIG. 3) and/or any location accessible via communications network 414 (FIG. 4)) listing graphical properties that correspond to different events to determine the first graphical property.

At step 708, the media guidance application generates (e.g., via control circuitry 304 (FIG. 3)) for simultaneous display (e.g., on display 312 (FIG. 3)) a first progress bar (e.g., progress bar 218 (FIG. 2)) with the first graphical property for the first media asset and a second progress bar (e.g., progress bar 220 (FIG. 2)) with the second graphical property for the second media asset. For example, if the user's progress in the first media asset corresponds to the appearance of a new character, the progress bar (or a graphic associated with the progress bar) may appear with a different color, a modified dimension, and/or a textual description of the event (e.g., as discussed in relation to FIG. 5).

Figure 9:
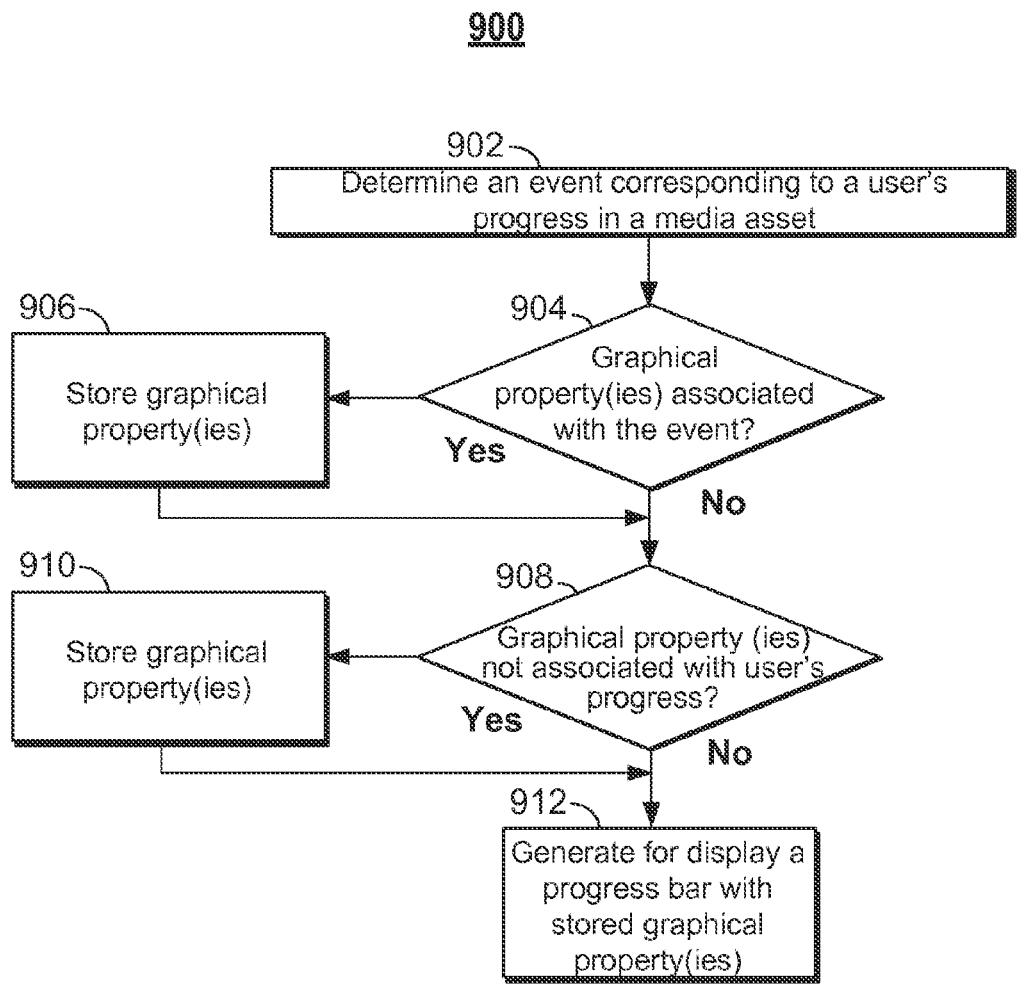
FIG. 9 is a flowchart of illustrative steps for presenting a progress bar with one or more graphical properties in accordance with some embodiments of the disclosure.

In some embodiments, the media guidance application may modify the graphical properties of a progress bar based on other factors that may be unrelated to a user's progress in the media asset (e.g., as discussed in relation to FIG. 9). For example, the media guidance application may modify a progress bar based on a device upon which a portion of a media asset was consumed, a number of times a portion of a media asset was consumed, a user that consumed a portion of the media asset, and/or whether or not the portion corresponds to content from a social network.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 8:
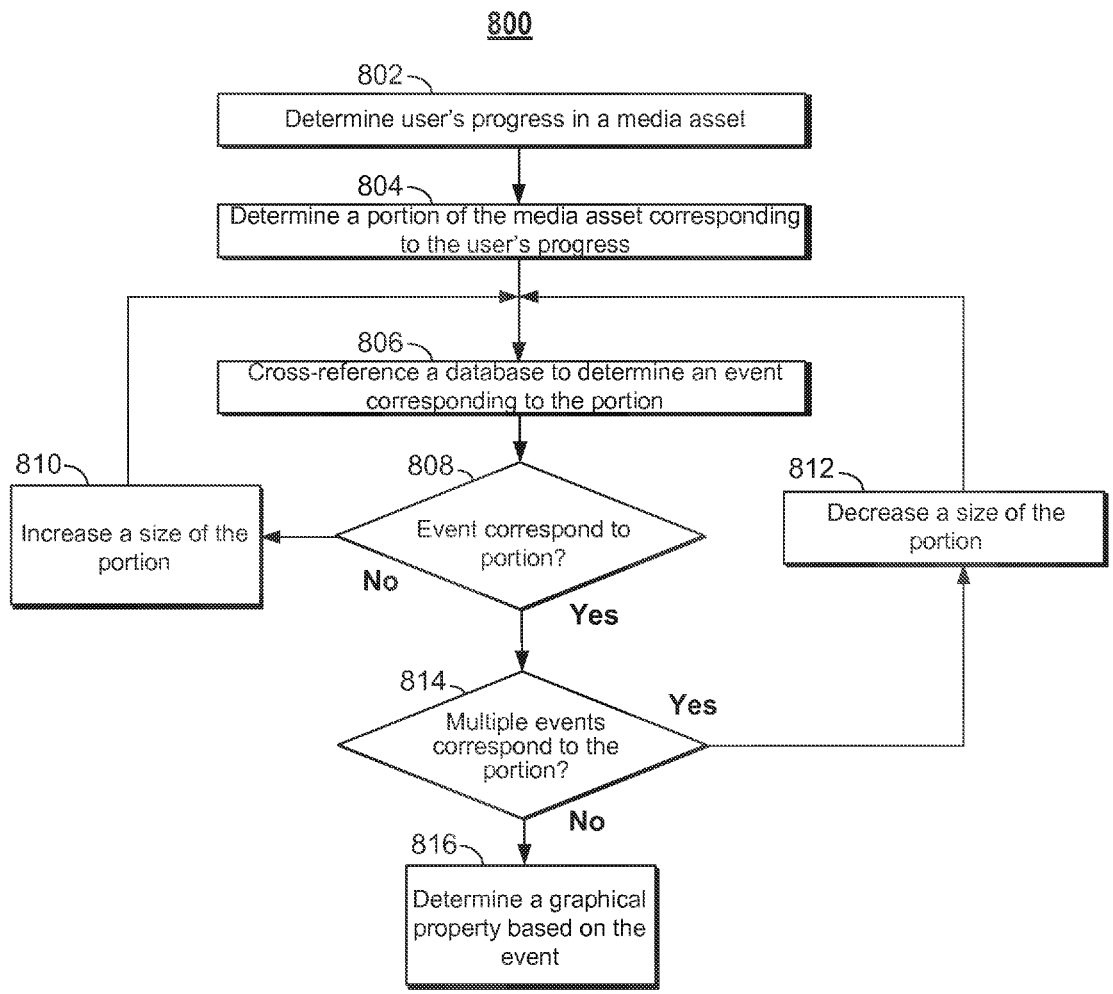
FIG. 8 is a flowchart of illustrative steps for determining a graphical property based on an event in accordance with some embodiments of the disclosure.

FIG. 8 is a flowchart of illustrative steps for determining a graphical property based on an event. It should be noted that process 800 or any step thereof could be performed on, or provided by, any of the devices shown in FIGS. 3-4. For example, process 800 may be executed by control circuitry 304 (FIG. 3) as instructed by a media guidance application implemented on user equipment 402, 404, and/or 406 (FIG. 4) in order to determine a graphical property based on an event. In addition, one or more steps of process 800 may be incorporated into or combined with one or more steps of any other process or embodiment.

At step 802, the media guidance application determines (e.g., via control circuitry 304 (FIG. 3)) a user's progress in a media asset. For example, the media guidance application may track the amount (e.g., in terms of total time and/or number of frames) of a media asset consumed by a user. Additionally or alternatively, the media guidance application may detect (e.g., via control circuitry 304 (FIG. 3)) a current progress point (e.g., a frame, time-mark, etc.) of the media asset and compare (e.g., via control circuitry 304 (FIG. 3)) the detected point to a total play length of the media asset.

At step 804, the media guidance application determines (e.g., via control circuitry 304 (FIG. 3)) a portion of the media asset corresponding to the user's progress. For example, after detecting (e.g., via control circuitry 304 (FIG. 3)) a current progress point (e.g., a frame, time-mark, etc.), the media guidance application may determine a portion of the media asset that includes the detected point. For example, the detected point may correspond to a time-mark (e.g., the thirty-minute mark in the media asset) that corresponds to a scene, which includes a time period (e.g., starting at the twenty-eight minute mark and ending at the thirty-third minute mark).

At step 806, the media guidance application cross-references (e.g., via control circuitry 304 (FIG. 3)) a database (e.g., located at storage 308 (FIG. 3) and/or at any location accessible via communications network 414 (FIG. 4)) to determine an event corresponding to the portion. For example, the media guidance application may input the detected point (e.g., the thirty minute mark) into the database, and the database may output one or more portions that correspond to the detected point. For example, a first portion may include a time period starting at the twenty-eight minute mark and ending at the thirty-first minute mark. A second portion may include a time period starting at the twenty-first minute mark and ending at the thirty-ninth minute mark, and a third portion may include a time period starting at the ten minute mark and ending at the sixty minute mark.

At step 808, the media guidance application determines (e.g., via control circuitry 304 (FIG. 3)) whether or not an event corresponds to the portion). For example, the media guidance application may cross-reference the portion with a database (e.g., located at storage 308 (FIG. 3) and/or any location accessible via communications network 414 (FIG. 4)) listing events that correspond to various portions of the media asset. If the media guidance application determines that no events correspond to the portion, the media guidance application proceeds to step 810 and increases the size of the portion. For example, if no event corresponds to a first portion that includes a time period starting at the twenty-eight minute mark and ending at the thirty-first minute mark, the media guidance application may extend the portion to include a time period starting at the twenty-fifth minute mark and ending at the thirty-fifth minute mark. Alternatively, the media guidance application may select a different portion that is longer than the previously selected portion, but still includes the detected point.

If the media guidance application determines that an event correspond to the portion, the media guidance application proceeds to step 814 and determines (e.g., via control circuitry 304 (FIG. 3)) whether or not multiple events correspond to the portion. For example, the media guidance application may ensure that each portion (e.g., as associated with a graphical property) corresponds to only a single point). If the media guidance application determines that the portion corresponds to only a single event, the media guidance application proceeds to step 816 and determines a graphical property based on the event (e.g., as described in relation to step 706 (FIG. 7)).

If the media guidance application determines (e.g., via control circuitry 304 (FIG. 3)) that the portion corresponds to multiple events, the media guidance application proceeds to step 812 and decreases the size of the portion. For example, if two events corresponds to a first portion that includes a time period starting at the twenty-eight minute mark and ending at the thirty-first minute mark, the media guidance application may restrict the portion to include a time period starting at the twenty-ninth minute mark and ending at the thirty minute mark. Alternatively, the media guidance application may select a different portion that is shorter than the previously selected portion, but still includes the detected point.

It should be noted that in some embodiments, the media guidance application determine that multiple events are associated with the same portion and apply multiple graphical properties to a progress bar. For example, in addition to the media guidance application generating for display a textual description (e.g., textual description 506 (FIG. 5)) corresponding to one event, the media guidance application may alter the color of the progress bar based on another event.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

FIG. 9 is a flowchart of illustrative steps for presenting a progress bar with one or more graphical properties. It should be noted that process 900 or any step thereof could be performed on, or provided by, any of the devices shown in FIGS. 3-4. For example, process 900 may be executed by control circuitry 304 (FIG. 3) as instructed by a media guidance application implemented on user equipment 402, 404, and/or 406 (FIG. 4) in order to present a progress bar with one or more graphical properties. In addition, one or more steps of process 900 may be incorporated into or combined with one or more steps of any other process or embodiment.

At step 902, the media guidance application determines (e.g., via control circuitry 304 (FIG. 3)) an event corresponding to a user's progress in the media asset. For example, the media guidance application may cross-reference (e.g., via control circuitry 304 (FIG. 3)) a database (e.g., located at storage 308 (FIG. 3) and/or at any location accessible via communications network 414 (FIG. 4)) to determine an event corresponding to the user's progress. For example, the media guidance application may input a progress point of the user (e.g., a frame number) into the database, and the database may output one or more events that correspond to the progress point.

At step 904, the media guidance application determines whether or not one or more graphical properties are associated with an event. For example, the media guidance application may cross-reference (e.g., via control circuitry 304 (FIG. 3)) the event with a database (e.g., located at storage 308 (FIG. 3) and/or any location accessible via communications network 414 (FIG. 4)) listing graphical properties that correspond to different events to determine one or more graphical properties that correspond to the event.

If the media guidance application determines that one or more graphical properties are associated with the event, the media guidance application proceeds to step 906 and stores the graphical properties. For example, the media guidance application may record (e.g., in storage 308 FIG. 3)) any graphical properties that are associated with the event before proceeding to step 908. If the media guidance application determines that one or more graphical properties are not associated with the event, the media guidance application proceeds directly to step 908.

At step 908, the media guidance application determines whether or not one or more graphical properties that are not associated with the user's progress should be applied to a progress bar. For example, the media guidance application may modify (e.g., via control circuitry 304 (FIG. 3)) the graphical properties of a progress bar (e.g., progress bar 220 (FIG. 2)) based on other factors that may be unrelated to a user's progress in the media asset.

For example, the progress bar may feature a first color (e.g., corresponding to a first device) for a first portion and a second color (e.g., corresponding to a second device) for a second portion, in which each color indicates on which device each portion of the media asset was consumed. For example, the media guidance application may select a graphical property to associated with the progress bar (or a portion of the progress bar) based on a device used to consume the media asset.

In another example, the progress bar (or a graphic associated with the progress bar) may feature a first animation during a portion of the media asset that has been watched before, and a different animation for a portion of the media asset that has not been watched before. For example, the media guidance application may select a graphical property to associated with the progress bar (or a portion of the progress bar) based on a number of times a portion of a media asset was consumed.

In another example, the progress bar (or a graphic associated with the progress bar) may feature a first dimension during a portion of the media asset that was consumed by a first user, and a different dimension for a portion of the media asset that was consumed by a different user. For example, the media guidance application may select a graphical property to associated with the progress bar (or a portion of the progress bar) based on a user that consumed a portion of the media asset.

In another example, the progress bar (or a graphic associated with the progress bar) may feature a first textual description during a portion of the media asset that was "liked" by a social network associate of the user, and a different textual description for a portion of the media asset that was not "liked" by a social network associate of the user. For example, the media guidance application may select a graphical property to associated with the progress bar (or a portion of the progress bar) based on whether or not the portion corresponds to content from a social network.

If the media guidance application determines that one or more graphical properties that are not associated with the user's progress should be applied to a progress bar, the media guidance application proceeds to step 910 and stores the graphical properties. For example, the media guidance application may record (e.g., in storage 308 FIG. 3)) any graphical properties that should be applied to the progress bar before proceeding to step 912. If the media guidance application determines that one or more graphical properties that are not associated with the user's progress should not be applied to the progress bar, the media guidance application proceeds directly to step 912.

At step 912, the media guidance application generates (e.g., via control circuitry 304 (FIG. 3)) for display (e.g., on display 312 (FIG. 3)) a progress bar (e.g., progress bar 502 (FIG. 5)) with one or more stored graphical properties (e.g., graphical property 222 (FIG. 2) and/or graphical property 224 (FIG. 2)). It should be noted that in some embodiments, the media guidance application may determine one or more graphical properties that are not associated with the user's progress should be applied to a progress bar without first determining whether or not any graphical properties are associated with an event or the user's progress.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for presenting information about media assets, the method comprising:
    generating for display a progress bar for a media asset;
    receiving an indicium of an event in the media asset;
    determining a point on the progress bar corresponding to the event;
    retrieving, from a database, a description of the event;
    determining, based on a number of characters in the retrieved description, an amount of space required to display the description;
    selecting a new dimension of the progress bar based on the amount of space required to display every character of the characters in the retrieved description; and
    modifying the progress bar to the new dimension to accommodate the description of the event.

2. The method of claim 1, further comprising cross-referencing the point with a database listing descriptions of events at various points in the media asset.

3. The method of claim 1, further comprising:
    determining a type of the event;
    cross-referencing the type of event in a database listing graphical properties that correspond to types of events to determine a graphical property that corresponds to the type of event; and
    modifying the progress bar to include the graphical property at the event.

4. The method of claim 3, wherein the graphical property includes a color, a brightness, or an animation.

5. The method of claim 1, further comprising:
    determining a user's progress in the media asset;
    determining whether the user's progress corresponds to the point; and
    in response to determining that the user's progress does not correspond to the point, not modifying the dimension of the progress bar.

6. The method of claim 1, wherein the dimension includes a size or shape of the progress bar.

7. The method of claim 1, further comprising:
generating for display the media asset; and
overlaying the progress bar on the media asset.

8. The method of claim 1, wherein the indicium is received from a social network.

9. The method of claim 1, wherein the indicium indicates an important or popular moment in the media asset.

10. A system for presenting information about media assets, the system comprising:
storage circuitry configured to store a dimension of a progress bar for a media asset; and control circuitry configured to:
generate for display the progress bar;
receive an indicium of an event in the media asset;
determine a point on the progress bar corresponding to the event;
retrieve, from a database, a description of the event;
determine, based on a number of characters in the retrieved description, an amount of space required to display the description;
select a new dimension of the progress bar based on the amount of space required to display every character of the characters in the retrieved description; and
modify the progress bar to the new dimension to accommodate the description of the event.

11. The system of claim 10, wherein the control circuitry is further configured to cross-reference the point with a database listing descriptions of events at various points in the media asset.

12. The system of claim 10, wherein the control circuitry is further configured to:
determine a type of the event;
cross-reference the type of event in a database listing graphical properties that correspond to types of events to determine a graphical property that corresponds to the type of event; and
modify the progress bar to include the graphical property at the event.

13. The system of claim 12, wherein the graphical property includes a color, a brightness, or an animation.

14. The system of claim 10, wherein the control circuitry is further configured to:
determine a user's progress in the media asset;
determine whether the user's progress corresponds to the point; and
in response to determining that the user's progress does not correspond to the point, not modify the dimension of the progress bar.

15. The system of claim 10, wherein the dimension includes a size or shape of the progress bar.

16. The system of claim 10, wherein the control circuitry is further configured to:
generate for display the media asset; and
overlay the progress bar on the media asset.

17. The system of claim 10, wherein the indicium is received from a social network.

18. The system of claim 10, wherein the indicium indicates an important or popular moment in the media asset.

* * * * *